United States Patent [19]

Berens et al.

[11] 4,016,771
[45] Apr. 12, 1977

[54] MOUNTING FOR A CONE PULLEY TRANSMISSION

[75] Inventors: Heinrich Berens, Bad Homburg; Stefan Füle, Bad Nauheim, both of Germany

[73] Assignee: P.I.V. Antrieb Werner Reimers Kommanditgesellschaft, Bad Homburg, Germany

[22] Filed: Sept. 29, 1975

[21] Appl. No.: 617,708

[30] Foreign Application Priority Data

Oct. 9, 1974 Germany ............................ 2449819

[52] U.S. Cl. ..................... 74/230.17 M; 308/184 R
[51] Int. Cl. ..................... F16h 11/06; F16h 55/56; F16c 27/00
[58] Field of Search .......... 74/230.17 M, 230.17 E, 74/230.17 B, 230.17 F; 308/233, 219, 184 R

[56] References Cited

UNITED STATES PATENTS

| | | | |
|---|---|---|---|
| 3,034,367 | 5/1962 | Steuer | 74/230.17 M |
| 3,075,395 | 1/1963 | Leland et al. | 308/233 |
| 3,093,427 | 6/1963 | Vasta | 308/219 |
| 3,146,979 | 9/1964 | Keetch | 308/184 R |
| 3,224,287 | 12/1965 | Gescheet et al. | 74/230.17 M |
| 3,361,503 | 1/1968 | Greby | 308/233 |
| 3,722,308 | 3/1973 | Steuer | 74/230.17 M |
| 3,934,956 | 1/1976 | Pitner | 308/219 |

FOREIGN PATENTS OR APPLICATIONS 1,178,662   9/1964   Germany .................... 74/230.17 F

*Primary Examiner*—Samuel Scott
*Assistant Examiner*—Allan R. Burke
*Attorney, Agent, or Firm*—Spencer & Kaye

[57] ABSTRACT

A cone pulley transmission has a shaft, a first and a second pulley disc mounted on the shaft and axially displaceable thereon with respect to one another. An axial anti-friction bearing mounted on the shaft is in engagement with the first pulley disc and a bearing disc of radial orientation also mounted on the shaft. The shaft further carries an axially secured support disc adjacent that side of the bearing disc which is oriented away from the anti-friction bearing. The bearing disc is movable with respect to the support disc. Between the bearing disc and the support disc there is disposed a deformable intermediate layer which is enclosed on all sides and which is in engagement with the bearing disc and the support disc.

7 Claims, 2 Drawing Figures

MOUNTING FOR A CONE PULLEY TRANSMISSION

BACKGROUND OF THE INVENTION

The invention relates to a mounting for the pulley discs of a belt-type cone pulley transmission in which two pulley discs are rotatably and axially displaceably arranged on a shaft. The pulley discs are coupled to one another in such a manner that they are axially movable with respect to one another, but are constrained to rotate in unison with respect to the shaft. Further, between the shaft, a support disc axially immobilized on the shaft and one pulley disc there is provided a mounting which takes up the radial and axial forces. At least the axial mounting is an anti-friction bearing having rolling surfaces extending substantially radially of the shaft, and further, the pulley discs are coupled with the shaft through a pressing device which operates dependent upon the torque or upon the torque and the transmission ratio.

Mountings of the above-outlined type are known and are disclosed, for example, in German Pat. Nos. 1,124,779 and 1,550,912 to which there correspond, respectively, U.S. Pat. Nos. 3,034,367 and 3,429,193. In these structures, however, the axial mounting is problematical, which, similarly to the radial mounting, is necessary only because upon a variation of the transmission ratio or upon a variation of the power to be transmitted by the transmission, the position of the cone pulley in relation to its shaft varies in the peripheral direction. This is so, because the mutually opposite cam paths of the pressing device vary their mutual relative position to adapt to the new working conditions. These difficulties stem from the fact that the axial bearings are also subjected, when the transmission is in rotation, to a rotating load. This is of particular significance because, on the one hand, the bearings are stationary during most of the operational periods since the transmission rotates with predetermined load and fixed ratio, and, on the other hand, because as a result of the rotating flexure of the pulley discs and shaft occurring due to the rotating load, only a small part of the axial bearing is ever in effective contact.

These circumstances cause a fretting corrosion and eventually result in the rolling bodies working themselves into the bearing surfaces, which could not be prevented hitherto even by special design measures such as additional lubrication or forced circulation of the rolling bodies.

According to German Pat. No. 1,550,912 an attempt was made to provide a remedy in that at least the fixed pulley discs are mounted on the transmission shaft merely by means of two bearings and that at least one of the bearings is formed as an oblique bearing to take up axial and radial forces, thus rendering possible a play-free support of the pulley disc on the shaft. It was found in practice, however, that even this arrangement does not entirely eliminate the described disadvantages.

A solution to the stated problem which is satisfactory for most cases has become known from German Pat. No. 2,016,181, to which there corresponds U.S. Pat. No. 3,722,308. Its object is based on the recognition that a wobbling movement occurs due to the superimposition of tilting movement and rotation of the respective pulley disc, caused by the rotating load. This wobble results, especially in the axial bearings which are designed only for a rolling movement in the peripheral direction, in small sliding movements between rolling bodies and bearing surfaces. This applies not only to rolling bodies in the form of cylinders but also to those in the form of balls, since their radial mobility is hindered by the bearing channel and its abutment shoulders. Once the rolling bodies have worked themselves into the bearing surfaces, a variation of transmission ratio of the transmission is only conditionally possible if at all, since, as a result of the detent effect between pulley discs and shaft, generated in the axial bearings, the necessary angular travel between pulley discs and shafts can no longer be executed or, at best, leads to a jolting and thus sudden variation of the transmission ratio.

Based on this recognition, according to German Pat. No. 2,016,181 the axial bearing is essentially of such configuration that, in case of flat rolling surfaces, the rolling bodies are formed as rotationally symmetrical ellipsoids cut away on both sides, or, in case convex bearing surfaces are provided, the rolling bodies are also formed as cylinders. Further, the rolling bodies are rotatably mounted in a retaining ring with a journal extending radially outwardy of the transmission shaft. Thus, an articulation effect of the axial mounting occurs, so that movement deriving from the corresponding wobbling movement of the associated pulley disc is converted into a rolling movement between rolling bodies and bearing surfaces.

In some instances where belt-type cone pulley transmissions are used, however, both axial and torsional oscillations occur on the axial bearing. The axial oscillations derive from the already-mentioned, rotation-caused flexure of pulley discs and shafts. the torsional oscillations are, however, introduced into the transmission from the exterior. The source of such torsional oscillations, for example, may be a jointed shaft which is coupled to the transmission and which generates an irregular peripheral speed at the cone pulley assembly. Such axial and torsional oscillations which frequently also occur with different amplitudes of oscillation, generate an increased slip within the axial bearing, thus damaging the balls, rollers or rolling surfaces, thereby preventing satisfactory operation of the transmission.

SUMMARY OF THE INVENTION

It is thus an object of the invention to modify a mounting of the initially described kind so that within the axial anti-friction bearing a uniform load distribution and an at least largely pulsation-free loading are achieved. This is to be accomplished by simple and thus inexpensive measures without appreciably affecting the size of the transmission.

This object and others to become apparent as the specification progresses, are accomplished by the invention, according to which, briefly stated, between the support disc and the axial anti-friction bearing there is arranged a radially extending anti-friction bearing disc which rotates with the shaft and is movable in relation to the support disc. Further, the anti-friction bearing disc is supported on the support disc by means of a substantially radially extending, deformable intermediate layer which is tightly enclosed on all sides.

As experiments have already confirmed this measure has provided a solution to the problem of the axial mounting of the fixed pulley disc even in those cases where both axial and torsional oscillations occur. The elimination of the slip caused by the torsional oscillations is effected by the vibration-damping effect of the deformable intermediate layer. Moreover a considerable noise suppression occurs with regard to the axial anti-friction bearing.

It has been found expedient to enclose the intermediate layer formfittingly by a support ring which extends axially into a recess of the support disc and a recess of the anti-friction bearing disc. These recesses center the support disc with slight radial play. Further, a limited axial mobility exists between the support ring on the one hand and the support disc and anti-friction bearing disc on the other. Thus the intermediate layer, through which the entire axial bearing force passes is secured against being pressed radially out of the space between the support disc and the anti-friction bearing disc.

It has been found especially advantageous to shape the anti-friction bearing disc as a thin diaphragm. This makes it possible for the anti-friction bearing disc not only to execute tilting movements, but also to be itself deformed elastically in order to adapt itself to the local loads in each case. In this manner a particularly uniform, effective contact of the anti-friction bearing is insured on all sides. In this case the recess of the anti-friction bearing disc can be formed by a circumferential projection extendng axially therefrom.

For an additional centering of the anti-friction bearing disc it is advantageous to arrange it with slight radial play in relation to the shaft. This play, on the one hand, does not hinder the necessary tilting mobility of the anti-friction bearing disc, but, on the other hand, does not allow an excessive outward travel in the radial direction.

The intermediate layer may be an elastomer, for example Perbunan NBR. Further, the intermediate layer may be formed by a filling constituted by a liquid or a jelly-type material, for example grease, in which case on the side of the intermediate layer the respective abutment angles between shaft, support disc, anti-friction bearing disc and support ring are sealed off by inserted packings, such as 0-rings. One example for a filling constituted by a liquid is hydraulic or pressure oil.

DESCRIPTION OF THE PREFERRED EMBODIMENTS

Figure 1:
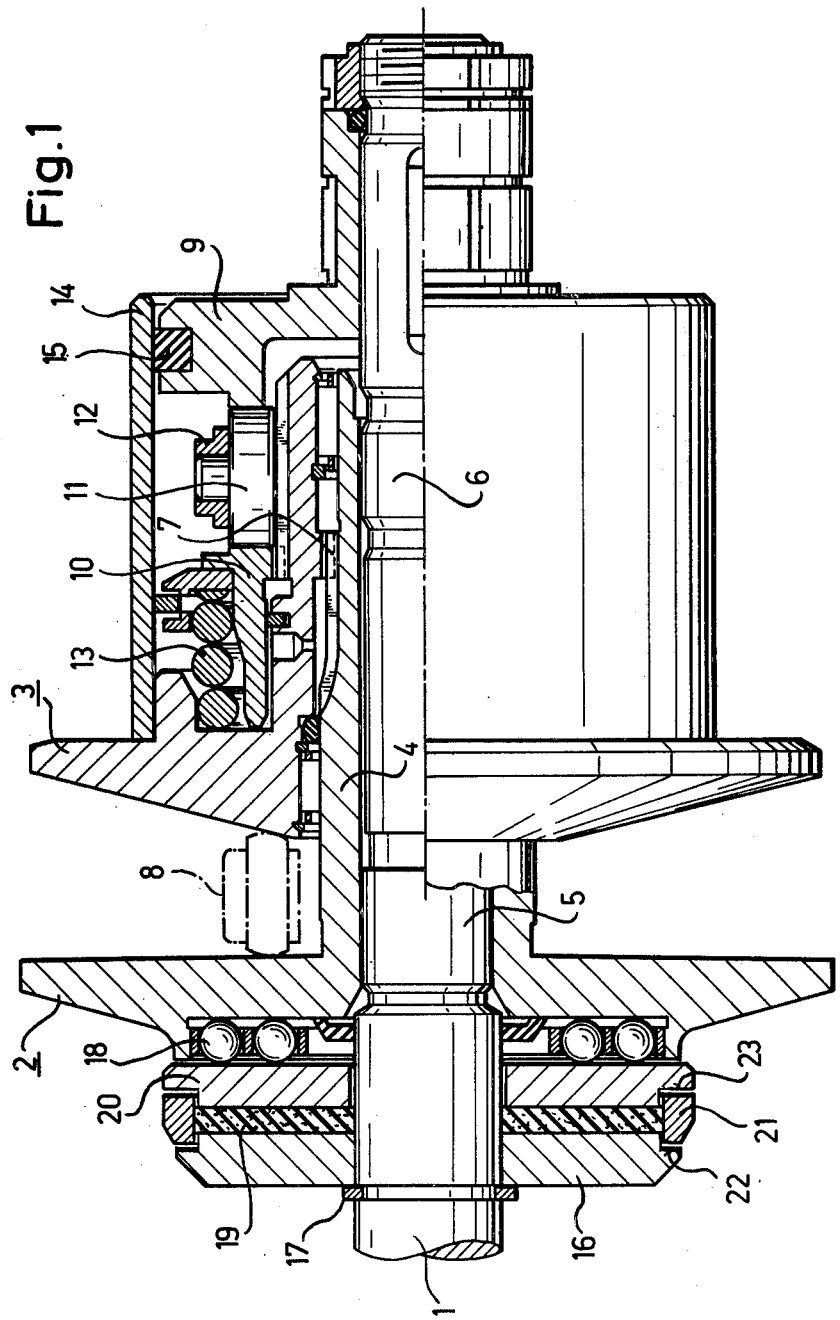
FIG. 1 is an axial sectional view of a cone pulley transmission incorporating a first preferred embodiment of the invention.

Turning now to FIG. 1, there is shown one of the shafts 1 of a belt-type cone pulley transmission with the parts arranged thereon. The transmission housing and the mounting of the shaft 1 is omitted for the sake of clarity, since the principle of assembly of such belt-type cone pulley transmissions is known, for example, from the initially-mentioned German patents.

Two pulley discs 2 and 3 are arranged on the shaft 1 which may be either a driving or a driven shaft. The pulley disc 2 is slidably mounted with a hub 4 on portions 5 and 6 of the shaft 1, while the pulley disc 3 is supported on the hub 4 at two locations. The pulley discs 2 and 3 are arranged axially slidably, but rotationally fixed with respect to one another by virtue of a spline 7. A traction means 8 rotates between the pulley discs 2 and 3.

The torque transmission between shaft 1 and pulley discs 2 and 3 is effected by a pressing device. The latter comprises a cam sleeve 9 affixed to the shaft 1 and a cam sleeve 10 connected to the pulley disc 3 for rotation in unison therewith. Between the cam paths oriented towards one another, there are inserted rolling bodies 11 for effecting force transmission. The rolling bodies 11 are held spaced from one another by a ring 12. A compression spring 13 ensures that in the case of a change of the direction of torque, the force flow between the cam sleeves 10 and 9 is not lost and that when the transmission is stationary, a minimum tension is maintained for the traction means 8. A pressing device of this type is conventional and is disclosed, for example, in the earlier-mentioned U.S. Pat. No. 3,722,308. In this embodiment, a further portion of the pressing force necessary between the pulley discs 2 and 3 and the traction means 8 is generated by a pressure medium which is present in a cylinder 14 firmly connected with the pulley disc 3. The cam sleeve 9 also serves here as a piston and is, for this purpose, provided with an 0-ring 15 which sealingly engages the inner wall of the cylinder 14. A fluid pressure generating device of this type and in this environment is conventional and is disclosed, for example, in U.S. Pat. No. 3,948,111.

The axial pressing force generated by the hydraulic pressure in the cylinder 14 and by the pressing device 9, 10, 11 is transmitted through the pulley disc 2 to the shaft 1 by a support disc 16 axially immobilized with respect to the shaft 1 by a circlip 17.

For suppressing axial and torsional oscillations, an elastomer packing (intermediate layer) 19 and an anti-friction bearing disc 20 are interposed between an axial anti-friction bearing 18 of the pulley disc 2 and the support disc 16. The anti-friction bearing disc 20, due to a slight radial play in relation to the shaft 1, has sufficient freedom of movement for transmitting these oscillations to the elastomer packing 19. The latter, in order to secure it against being pressed out of the clearance between the support disc 16 and the anti-friction bearing disc 20, is surrounded positively (formfittingly) by a support ring 21 which extends axially into a peripheral recess 22 of the support disc 16 and a peripheral recess 23 of the anti-friction bearing disc 20. These recesses center the ring 21 with a slight radial play. Here too, besides the already mentioned slight radial play, there is provided a certain axial mobility between the support disc 16 and the anti-friction disc 20 on the one hand and between the support disc 16 and the support ring 21 on the other hand in order to afford the anti-friction disc 20 the mobility necessary to perform its intended function.

Figure 2:
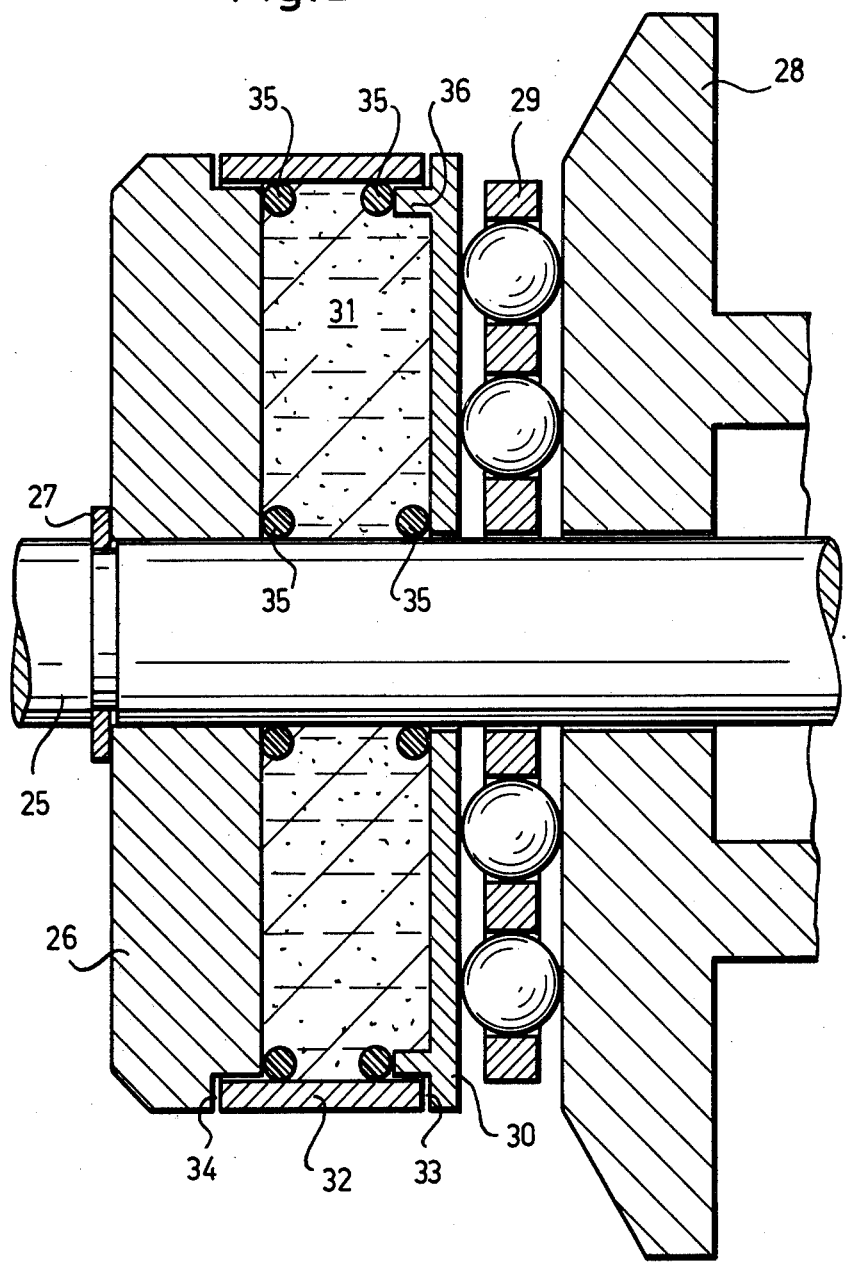
FIG. 2 is a fragmentary axial sectional view, on an enlarged scale, of a cone pulley transmission incorporating a second preferred embodiment of the invention.

Turning now to FIG. 2, there is shown another embodiment of the invention. Again, the support of the axial forces against the shaft 25 is effected by a support disc 26 which is secured to the shaft 25 by a circlip 27. The anti-friction bearing 29 axially loaded by an only partially illustrated pulley disc 28 bears against a diaphragm-like anti-friction bearing disc 30, that is, a disc which not only can execute small tilting and circumferential movements in relation to the shaft 25, but can itself by deformed. Between the support disc 26 and the anti-friction bearing diaphragm 30 there is disposed a grease filling (intermediate layer) 31 which is surrounded by a support ring 32. The latter extends axially into peripheral recesses 33 and 34 of the support disc 26 and the anti-friction bearing disc 30, respectively. The recess 33 is formed by an axially extending projection 36 of the anti-friction bearing diaphragm 30. To seal off the grease-filled space, packings in the form of 0-rings 35 are inserted into the respective abutment angles between shaft 25, the support disc 26, the anti-friction bearing diaphragm 30 and the support ring 32.

It will be understood that the above description of the present invention is susceptible to various modifications, changes and adaptations, and the same are intended to be comprehended within the meaning and range of equivalents of the appended claims.

What is claimed is:

1. In a mounting for a cone pulley transmission that includes a shaft; a first and a second pulley disc axially slidably mounted on the shaft; means coupling the first pulley disc to the second pulley disc for rotation in unison with respect to the shaft; a support disc axially fixedly mounted on the shaft; an axial anti-friction bearing mounted on the shaft in engagement with the first pulley disc and situated between the first pulley disc and the support disc; and a pressing device urging the pulley discs towards one another and coupling the pulley discs to the shaft; the improvement comprising a. a radially oriented bearing disc mounted on said shaft and being in engagement with said anti-friction bearing; said bearing disc being spaced from and being movable with respect to, said support disc;

b. a radially oriented deformable intermediate layer disposed between and in face-to-face engagement with, said suppot disc and said bearing disc; and c. means for tightly enclosing said intermediate layer at all sides for preventing said intermediate layer from undergoing, during operation, a permanent radial deformation.

2. A mounting as defined in claim 1, wherein said means for tightly enclosing said intermediate layer includes a support ring formfittingly surrounding said intermediate layer; further comprising means defining a peripheral recess in said support disc and said bearing disc; said support ring extending into the recesses with an axial and radial clearance.

3. A mounting as defined in claim 1, wherein said bearing disc is constituted by a thin diaphragm.

4. A mounting as defined in claim 2, wherein the peripheral recess in said bearing disc is defined in part by a circular projection forming part of said bearing disc and oriented towards said intermediate layer.

5. A mounting as defined in claim 1 wherein there is a radial clearance between said shaft and said bearing disc mounted thereon.

6. A mounting as defined in claim 1, wherein said intermediate layer is an elastomer.

7. A mounting as defined in claim 2, wherein said intermediate layer is constituted by a liquid or jelly-like filling, further comprising 0-rings situated between said shaft and said support disc, between said shaft and said bearing disc, between said support ring and said support disc and between said support ring and said bearing disc for sealing-in said intermediate layer.

* * * * *

UNITED STATES PATENT AND TRADEMARK OFFICE
CERTIFICATE OF CORRECTION

PATENT NO. : 4,016,771
DATED : April 12th, 1977
INVENTOR(S) : Heinrich Berens et al It is certified that error appears in the above-identified patent and that said Letters Patent are hereby corrected as shown below:

In the heading of the patent, under [30] Foreign Application Priority Data, change "Oct. 9, 1974" to --Oct. 19, 1974--. Under [75] Inventors: and under [73] Assignee: after "Bad Homburg" insert --v.d.H.--.

Column 2, line 24, change "outwardy" to --outwardly--; line 34, change "the" to --The--.

Column 4, line 64, change "by" to --be--.

Column 6, line 3, change "suppot" to --support--.

Signed and Sealed this ninth Day of August 1977

[SEAL]

Attest:

RUTH C. MASON
Attesting Officer

C. MARSHALL DANN
Commissioner of Patents and Trademarks